DAVID H. MORRISON.
Improvement in Iron-Bridges.
No. 4,398. Reissued May 23, 1871.
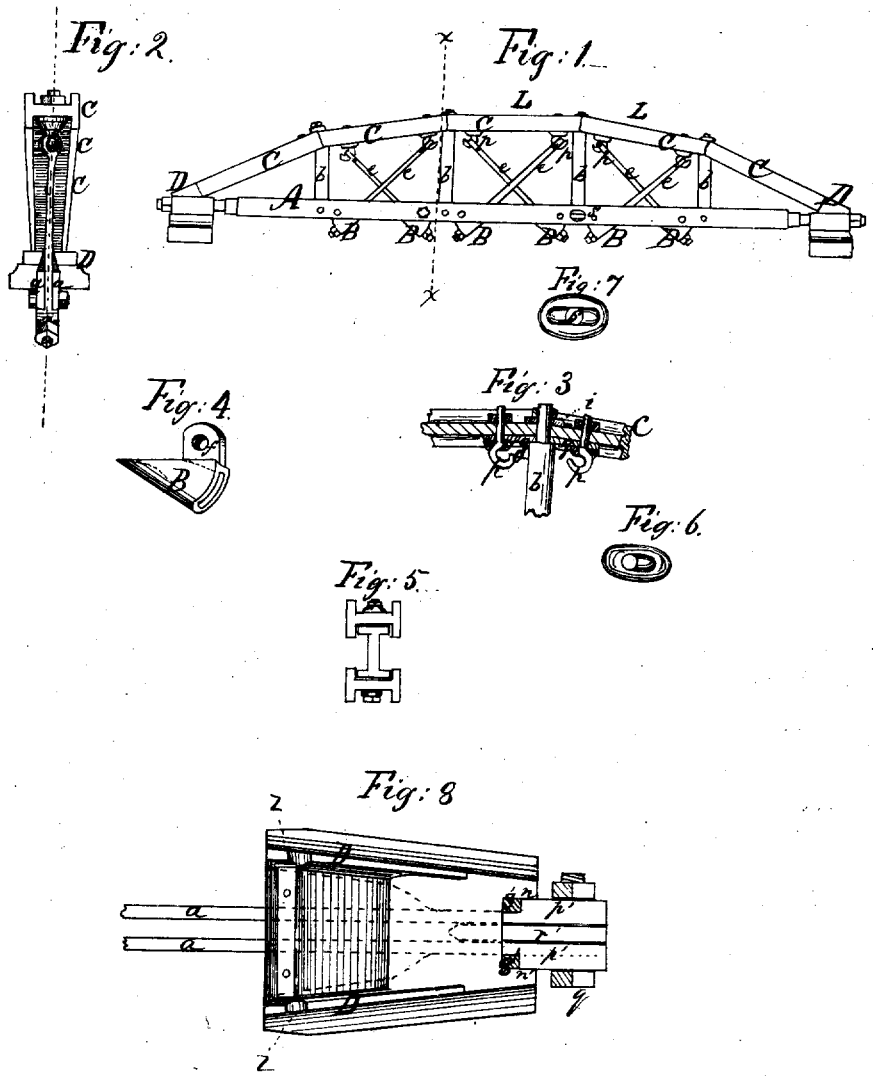
Witnesses
R A R Peck
Jos B Brock.
D. H. Morrison
Inventor by
his atty H. R. K. Peck
AM. PHOTO-LITHOGRAPHIC CO. N.Y. (OSBORNE'S PROCESS.)

UNITED STATES PATENT OFFICE.

DAVID H. MORRISON, OF DAYTON, OHIO.

IMPROVEMENT IN IRON BRIDGES.

Specification forming part of Letters Patent No. 70,245, dated October 29, 1867; reissue No. 4,398, dated May 23, 1871.

*To all whom it may concern:*

Be it known that I, DAVID H. MORRISON, of Dayton, in Montgomery county, in the State of Ohio, have invented certain new and useful Improvements in Iron Bridges; and I do hereby declare that the following is an exact and full description thereof, reference being had to the accompanying drawings and to the letters of reference marked thereon.

Figure 1 represents a side elevation of a bridge-truss in which my invention is embraced. Fig. 2 represents a transverse sectional view of the same, taken at the line *x x* of Fig. 1. Fig. 3 represents a longitudinal section of a portion of the arch of the truss, one post, arch-joint washer, arch-joint plate, and concave washers for supporting the diagonal brace-hooks. This figure is taken between the lines *z z* of Fig. 1. Fig. 4 represents the universal washer. Fig. 5 represents a transverse section of a modification of the arch. Fig. 6 represents the hook-bolt-supporting washer. Fig. 7 represents the eyebolt-supporting washer. Fig. 8 represents the skew-back detached.

My invention relates to the manner of applying the I-shaped iron beam in the construction of bridges, and to the devices by which the bridge structure is connected and supported.

The arch represented in Fig. 1 is what is denominated a "broken-line arch," all the joints of which are true radial lines of the arch.

In the accompanying drawings, A denotes the chord, which is constructed of two flat bars of iron, (seen at *a a* in Fig. 2,) which are placed parallel to each other, about one and a quarter inch apart, to allow sufficient space for splicing-pieces, and the ends of the posts *b*, the diagonal trussing eyebolts *e e*, and the lugs *f* of the universal washers B. The eyebolts *s* are inserted through holes in the ends of posts *b* to secure the posts between the bars *a a*, and they serve for fastenings for the diagonal horizontal brace-rods to be placed beneath the floor of the bridge. In the construction represented in Fig. 1 the beams of the arch are of equal length, and are jointed, and are uniformly beveled at their ends, excepting the ends of the pieces which fit upon the skew-backs D D, and, consequently, these beams will fit any position in the arch by bringing the beveled jointed ends together, as represented in Fig. 1.

The important feature of the invention consists in the arrangement of I-beams C with their flanges in vertical planes, and the transverse line of the web of the beam C will necessarily be at right angles to the vertical planes occupied by the flanges.

At each joint of the arch the washers *i i* are placed upon the webs of the beams. The upper ends of the posts *b* pass through them, and the nuts on the ends of the posts hold these washers firmly down upon the joints of the arch. The posts are bent slightly near their upper ends, where they pass through the arch-joints, so as to bisect them to make a secure fastening. Underneath each joint of the arch, and resting upon the shoulder of the post, arch-joint plates *g g* are placed, to strengthen the arch-joints, and the bolts *p p* pass through the plates *g* and the web of the arch-beams, as represented in Fig. 3. The hook-bolts are provided with a supporting-washer, Fig. 6, made with a concave depression, to form a seat for the shoulder of the hook, and to prevent sudden strain upon the diagonals *b b* from bending or breaking the hooks. The washer represented in Fig. 7 is also formed with a depression corresponding with the shape of the shoulders of the eyebolt *s*, and for the same purpose. The universal washer B is provided with the longitudinal opening through its center, indicated by dotted lines, for the diagonal brace-rods *b b* to pass through, and the lug *f* is inserted between the chord-bars *a a*, and a bolt secures this washer in place.

The universal washer being made with an enlarged opening for the diagonal rods, and with the curved face for the nut, it will be apparent that these nuts and diagonal braces, upon which the nuts are screwed, will both adjust themselves in proper relation to the line of the connections between the arch and the chord, whatever may be the angle they occupy.

In forming an arch or post of three I-beams, they will be connected together as represented in Fig. 5. The modification shown in Fig. 5 will afford great strength, and, like the single I-beam arranged in the arch or top chord of a bridge, when placed with its flanges in vertical planes, will resist the tendency to sway laterally, because the greater bulk of the metal in either of the modifications being in the flanges, and at the greatest distance laterally to the axis or central longitudinal line of the web, the compression of the top chord or arch by weight upon the bridge will not force the arch or top chord out of its true line.

Besides the use of the I-beam in the manner described, I have found it to be the most economical, as bridges made in conformity with this principle require less weight of metal, and afford a greater degree of strength.

I use the I-beam as a single piece of metal for the arch of bridges known as broken-line-arch bridges; and I prefer to use the beam in its straight form, as it is evident that it will resist greater power of compression as a straight beam than when formed in the arc of a circle.

The chord-bars *a a* (represented in Fig. 8) extend through the eye of the skew-back, as indicated in dotted lines, and, being doubled over at their ends and welded, are of the double thickness represented at *p′ p′*, and a metal block, *r′*, is inserted between them, which forces them laterally against the sides of the square enlargement *n′* in the end of the skew-back D, which enlargement forms shoulders *o′*, against which the shoulder on the chord-bars would rest. Wedges *s′ s′* may be inserted between the returned ends of the chord-bars and the shoulders of the enlargement of the skew-back, by which means the chord may be tightened and strained longitudinally. After the chord-bars *a a* are inserted in the opening in the skew-back, the block *r′* will be inserted, and a bolt, *q*, may be employed to secure the chord-bars and block *r′* together. *z z* indicate the seat of the skew-back, against which the end of the I-beam which forms the arch will rest.

The chord-bars may be tightened by means of a nut, as seen in Fig. 1, or by means of the wedges represented in Fig. 8.

The arrangement of the I-beams in the manner herein described, for the top chord or arch of a bridge, will resist greater power of compression and tendency to yield laterally than the cylindrical arch or chord of equal weight of metal. And when the I-beam is thus employed, and the arch is composed of a series of short straight beams, there is perfect security against any tendency to deflect vertically.

It is obvious that a truss formed upon the same plan described herein, and shown in Fig. 1 of the drawings, would be applicable in the construction of roofs.

Having fully described my improvements in iron bridges, what I claim as of my invention, and desire to secure by Letters Patent, is—

1. The construction of the arch or top chord of a bridge by the use of the iron I-beam, when arranged therein with its double flanges in vertical planes, substantially as described, for the purpose specified.

2. The universal washer B *f*, constructed and applied in the manner and for the purpose specified.

3. The combination and arrangement of the arch-beam C, arch-joint plates *g*, and universal washer B *f*, when constructed, connected, and operating conjointly in the manner substantially as and for the purpose specified.

In witness whereof I have hereunto set my hand this 18th day of March, 1868.

D. H. MORRISON.

Witnesses:
H. P. K. PECK,
WM. H. GRAVES.